US008811456B2

(12) United States Patent
Julian et al.

(10) Patent No.: US 8,811,456 B2
(45) Date of Patent: Aug. 19, 2014

(54) APPARATUS AND METHOD OF LOW LATENCY MULTI-HOP COMMUNICATION

(75) Inventors: David Jonathan Julian, San Diego, CA (US); Amal Ekbal, San Diego, CA (US); Chong U. Lee, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2006 days.

(21) Appl. No.: 11/697,807

(22) Filed: Apr. 9, 2007

(65) Prior Publication Data

US 2007/0286274 A1 Dec. 13, 2007

Related U.S. Application Data

(60) Provisional application No. 60/793,401, filed on Apr. 19, 2006.

(51) Int. Cl.
*H04B 1/38* (2006.01)
*H04W 88/04* (2009.01)
*H04W 16/14* (2009.01)

(52) U.S. Cl.
CPC ............ *H04W 88/04* (2013.01); *H04W 16/14* (2013.01); *H04B 1/38* (2013.01)
USPC ........................................................ 375/219

(58) Field of Classification Search
CPC ..... H04W 16/14; H04W 88/04; H04W 88/06; H04B 1/38
USPC .......................................... 375/219, 259, 260
See application file for complete search history.

(56) References Cited

U.S. PATENT DOCUMENTS

| 5,678,169 | A | * | 10/1997 | Turney ............................... 455/1 |
| 5,687,169 | A | | 11/1997 | Fullerton |
| 5,764,696 | A | | 6/1998 | Barnes et al. |
| 5,812,081 | A | | 9/1998 | Fullerton |
| 5,832,035 | A | | 11/1998 | Fullerton |
| 5,907,427 | A | | 5/1999 | Scalora et al. |
| 5,952,956 | A | | 9/1999 | Fullerton |
| 5,960,031 | A | | 9/1999 | Fullerton et al. |

(Continued)

FOREIGN PATENT DOCUMENTS

| EP | 1515452 | 3/2005 |
| JP | 2004247864 A | 9/2004 |
| WO | 96/34462 | 10/1996 |
| WO | 2004/098074 | 11/2004 |

OTHER PUBLICATIONS

International Search Report—PCT/US2007/066929, International Search Authority: European Patent Office, Sep. 28, 2007.
Written Opinion—PCT/US07/066929—International Search Authority, European Patent Office—Sep. 28, 2007.
International Preliminary Report on Patentability—PCT/US07/066929—International Search Authority, European Patent Office—Jul. 18, 2008.
Taiwan Search Report—TW096113839—TIPO—Mar. 15, 2011.

*Primary Examiner* — Kevin M Burd
(74) *Attorney, Agent, or Firm* — Paul S. Holdaway

(57) ABSTRACT

Aspects include methods and apparatuses for communicating in an ultra-wideband transmission. For example, some aspects include methods and apparatuses for multi-hop communication. For example, some aspects include a method of communicating data. The method includes receiving pulses indicative of a frame during a first time period and transmitting pulses indicative of the frame during a second time period to at least one device. The first and second time periods at least partially overlap. Other aspects include apparatus and devices for multi-hop communication.

44 Claims, 9 Drawing Sheets

(56) References Cited

U.S. PATENT DOCUMENTS

| | | |
|---|---|---|
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,356,548 B1 | 3/2002 | Nellenbach et al. |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Fullerton et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,505,032 B1 | 1/2003 | McCorkle et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,570,858 B1 * | 5/2003 | Emmons et al. ............... 370/321 |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,804,245 B2 | 10/2004 | Mitchem et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2003/0189975 A1 | 10/2003 | Fullerton |
| 2004/0100376 A1* | 5/2004 | Lye et al. ............... 340/539.12 |
| 2005/0042999 A1* | 2/2005 | Rappaport ............... 455/307 |
| 2005/0123024 A1* | 6/2005 | Santhoff et al. ............... 375/130 |
| 2005/0141553 A1* | 6/2005 | Kim et al. ............... 370/466 |
| 2006/0020433 A1 | 1/2006 | Taha et al. |
| 2008/0274692 A1* | 11/2008 | Larsson ............... 455/24 |

* cited by examiner

APPARATUS AND METHOD OF LOW LATENCY MULTI-HOP COMMUNICATION

CLAIM OF PRIORITY UNDER 35 U.S.C. §119

The present application for patent claims priority to U.S. Provisional Patent Application No. 60/793,401, entitled "METHOD FOR LOW LATENCY MULTI-HOP TRANSMISSIONS USING UWB" filed Apr. 19, 2006, assigned to the assignee hereof and hereby expressly incorporated by reference herein.

BACKGROUND

1. Field

This application relates generally to communications, and more specifically, to ultra-wide band communication.

2. Background

Ultra-wide band (UWB) technology enables wireless communications between devices. UWB technology may be employed for a variety of applications associated with wireless communication networks, for example, in personal area network ("PAN") or body area network ("BAN"). Devices in such a network may use multi-hop transmissions between devices to, for example, extend range, reduce power consumption, and in other use cases. Thus, a need exists for alternative methods and apparatuses for multi-hop communications in UWB networks.

SUMMARY

A summary of sample aspects of the disclosure follows. For convenience, one or more aspects of the disclosure may be referred to herein simply as "some aspects."

System, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include reduced multi-hop communications latency in, for example, a UWB system.

Some aspects include a method of communicating data. The method includes receiving pulses indicative of a frame during a first time period and transmitting pulses indicative of the frame during a second time period to at least one device. The first and second time periods at least partially overlap. Other aspects include apparatus and devices for multi-hop communication. For example, some aspects include devices such as headsets, watches, and medical devices configured to use such methods and apparatuses for communicating data.

DETAILED DESCRIPTION

The following detailed description is directed to certain specific aspects of the invention. However, the invention can be embodied in a multitude of different ways as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on time hopping sequences. In some aspects, concurrent channels may be established based on pulse repetition frequencies and time hopping sequences.

In a low costs/low complexity device, particularly one having low power consumption, generating suitable pulses for a pulse-based ultra-wide band (UWB) system can have a relatively high complexity/power cost. Accordingly, low complexity, low power, techniques are needed for generating pulses in such UWB systems.

Figure 1:
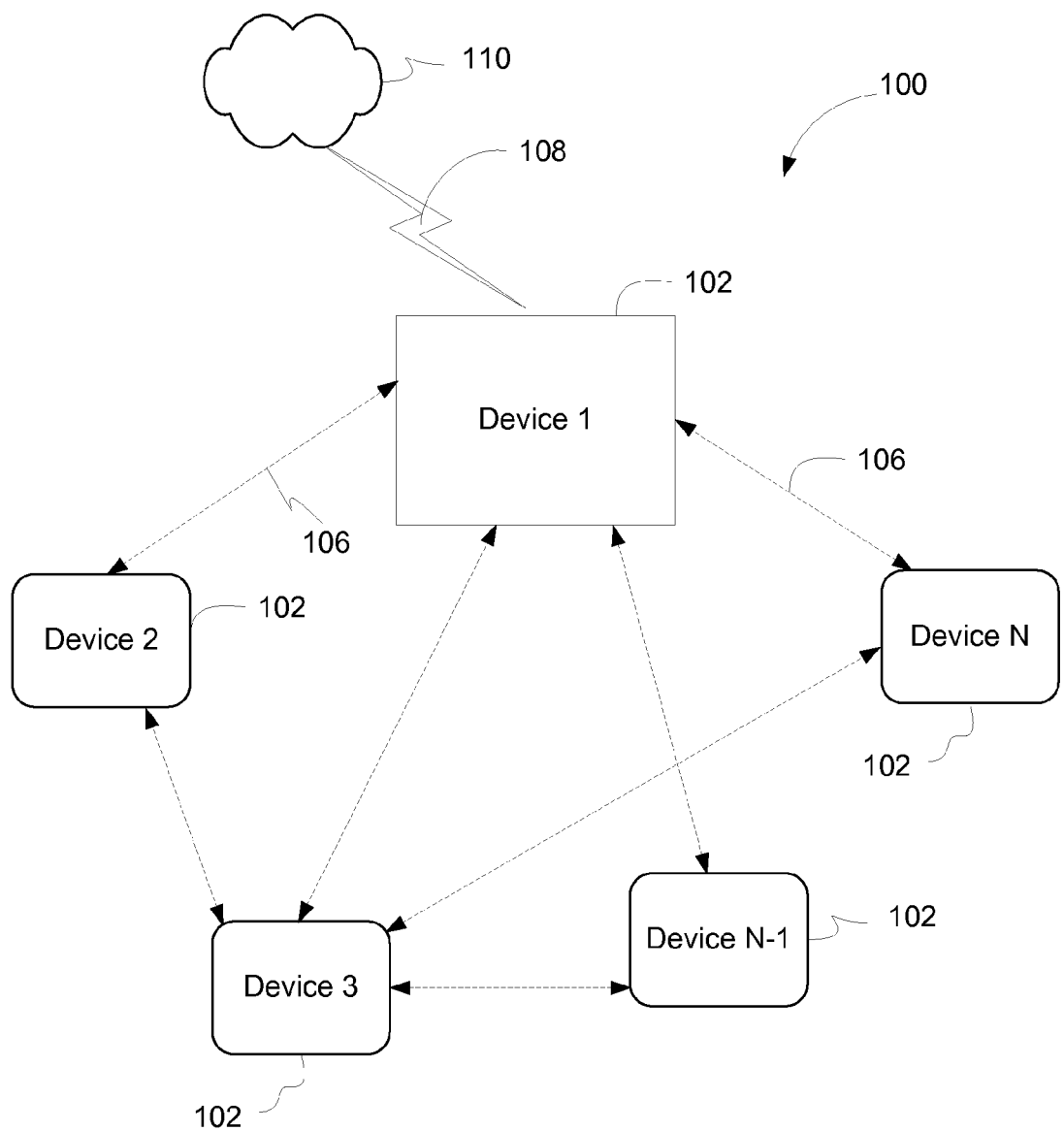
FIG. 1 is a block diagram illustrating an example network of wirelessly connected devices.

FIG. 1 is a block diagram illustrating an example network 100 of wirelessly connected devices 102 (e.g., Device 1, ..., Device N). The network 100 may comprise one or more of a personal area network (PAN) system and/or a body area network (BAN). The network 100 may optionally include one or more devices 102 that comprise a longer range, e.g., mobile telephone or other network interface and other device, each of which is configured to communicate over a wireless link 106. Each device 102 may be configured to communicate over the links 106 and at least one other data communications link, e.g., via any suitable wireless or wired network link. The devices 102 may comprise devices such as headsets and watches (or other portable devices configured to display information such as caller id from a phone and/or messages (or portions thereof) such as email, short message system (SMS) messages, or any other type of data, including data received over the wireless links 106 and 108. Each of the devices 102 may communicate with one, two, or any number of the other devices 102.

As discussed further below, in some aspects the communications link 106 a pulsed-based physical layer. For example, the physical layer may utilize ultra-wideband pulses that have a relatively short length (e.g., on the order of a few nanoseconds) and a relatively wide bandwidth. In some aspects, an ultra-wide band may be defined as having a fractional bandwidth on the order of approximately 20% or more and/or having a bandwidth on the order of approximately 500 MHz or more. The fractional bandwidth is a particular bandwidth associated with a device divided by its center frequency. For example, a device according to this disclosure may have a bandwidth of 1.75 GHz with center frequency 8.125 GHz and thus its fractional bandwidth is 1.75/8.125 or 21.5%.

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 2:
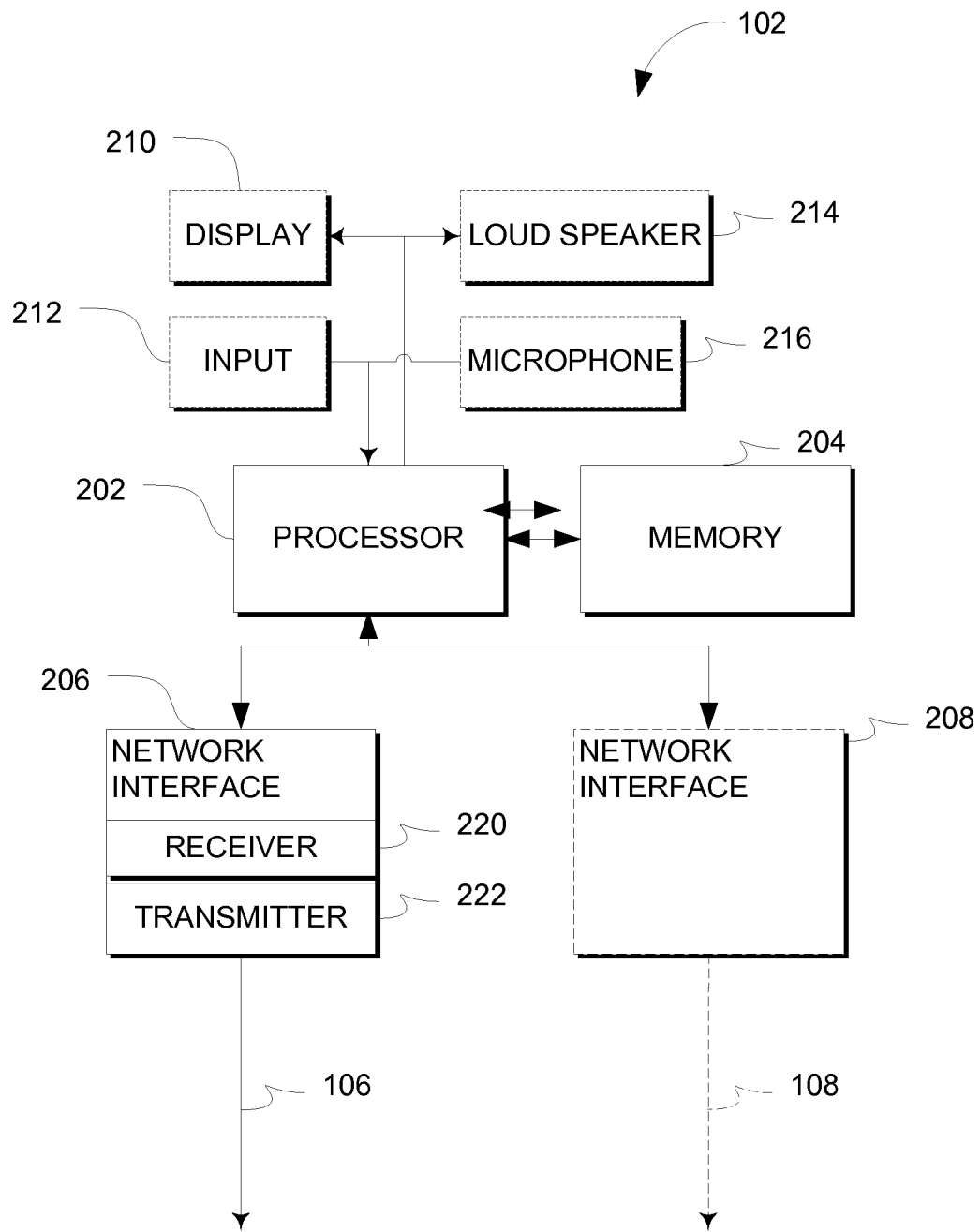
FIG. 2 is a block diagram illustrating an example of a wireless device such as illustrated in FIG. 1.

FIG. 2 is a block diagram illustrating an example of a wireless device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a watch may include the display 210 adapted to provide a visual output based on a signal received via the wireless communication link. A medical device may include one or more input devices 212 that include a sensor adapted to generate sensed signals to be transmitted via the wireless communication link 106.

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over the network 110 via a link 108. For example, the device 102 may provide connectivity to the other network 110 (e.g., a wide area network such as the Internet) via a wired or wireless communication link. Accordingly, the device 102 may enable other devices 102 (e.g., a Wi-Fi station) to access the other network. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3).

The device 102 may comprise at least one of a mobile handset, a personal digital assistant, a laptop computer, a headset, a vehicle hands free device, or any other electronic device. In addition, the device 102 may comprise one or more of a biomedical sensor, biometric sensor, a pacemaker, or any other device for measuring or affecting a human body. In particular, the teachings herein may be incorporated into (e.g., implemented within or performed by) a variety of the devices 102. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a biometric sensor (e.g., a heart rate monitor, a pedometer, an EKG device, a keyboard, a mouse, etc.), a user I/O device (e.g., a watch, a remote control, a light switch, etc.), a tire pressure monitor, a computer, a point-of-sale device, an entertainment device, a hearing aid, a set-top box, or any other suitable device.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further the transmitter 222 may comprises a processor for transmitting that provides various functionality relating to transmitting information to another device 102. The receiver 220 may comprises a processor for receiving that provides various functionality relating to receiving information from another device 102 as taught herein.

As noted above, FIG. 2 illustrates that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In some aspects, the device or apparatus 102 may comprise an integrated circuit. Thus, the integrated circuit may comprise one or more processors that provide the functionality of the processor components illustrated in FIG. 2. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

Figure 3:
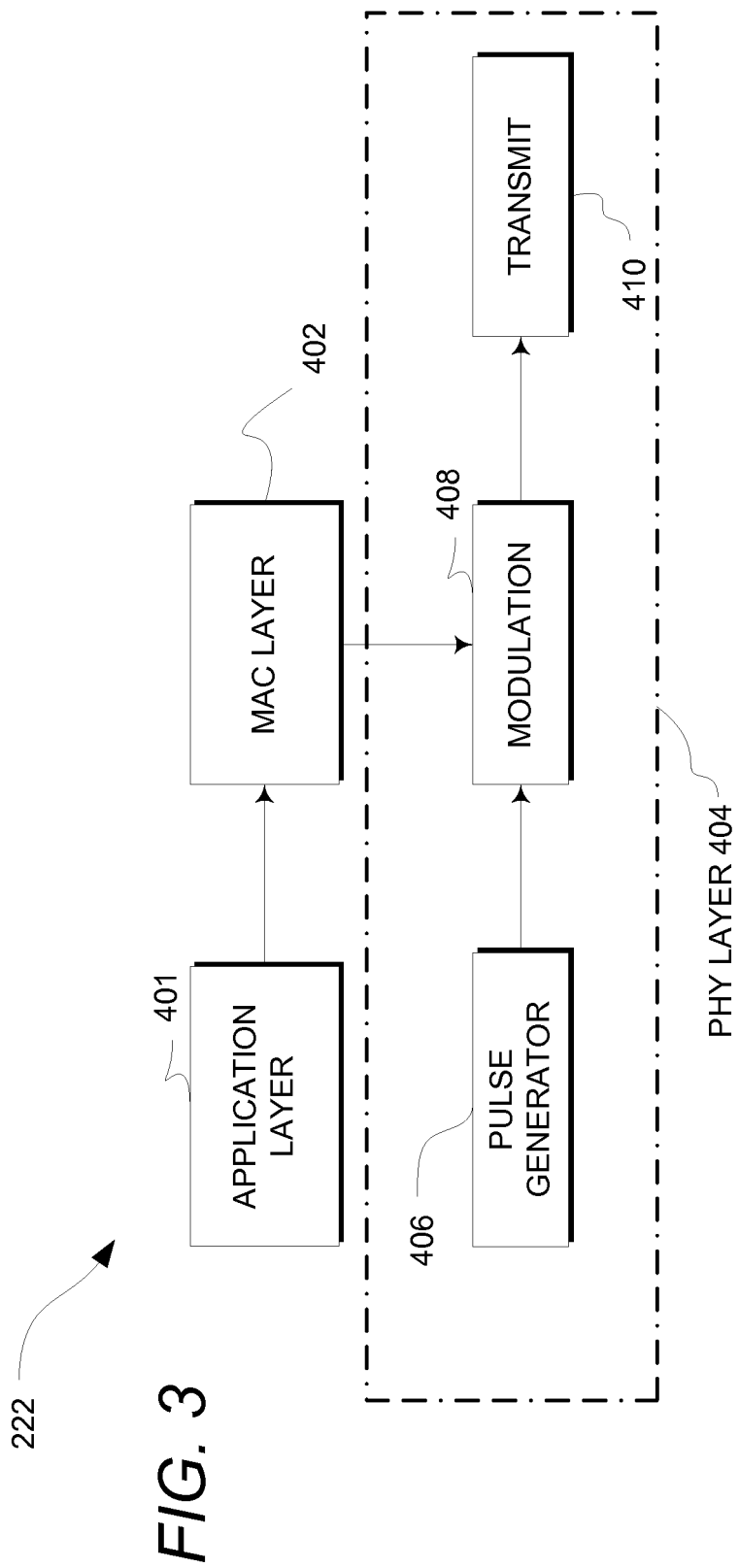
FIG. 3 is a block diagram illustrating a transmitter of a device such as illustrated in FIG. 2.

FIG. 3 is a block diagram illustrating an example of the transmitter 222 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. The transmitter 222 may include an application layer 401 that provides information to a data link or media access control (MAC) layer 402 for transmission, the media access control (MAC) layer 402 that receives data from the application layer 401 and provides it to a physical layer 404, and the physical (PHY) layer 404 that receives data from the MAC layer 402 and transmits the data over the wireless channel 106. In the illustrated transmitter 222, the PHY layer includes a pulse generator 406, a modulation block 408, and a transmit block 410. A phase locked loop (PLL) (not shown) may provide timing signals to the PHY layer. The pulse generator 406 generates waveforms such as Gaussian pulse waveforms. The modulation block 408 modulates the pulse signal based on an information signal provided by the MAC layer 402 using a scheme such as pulse position modulator, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 4:
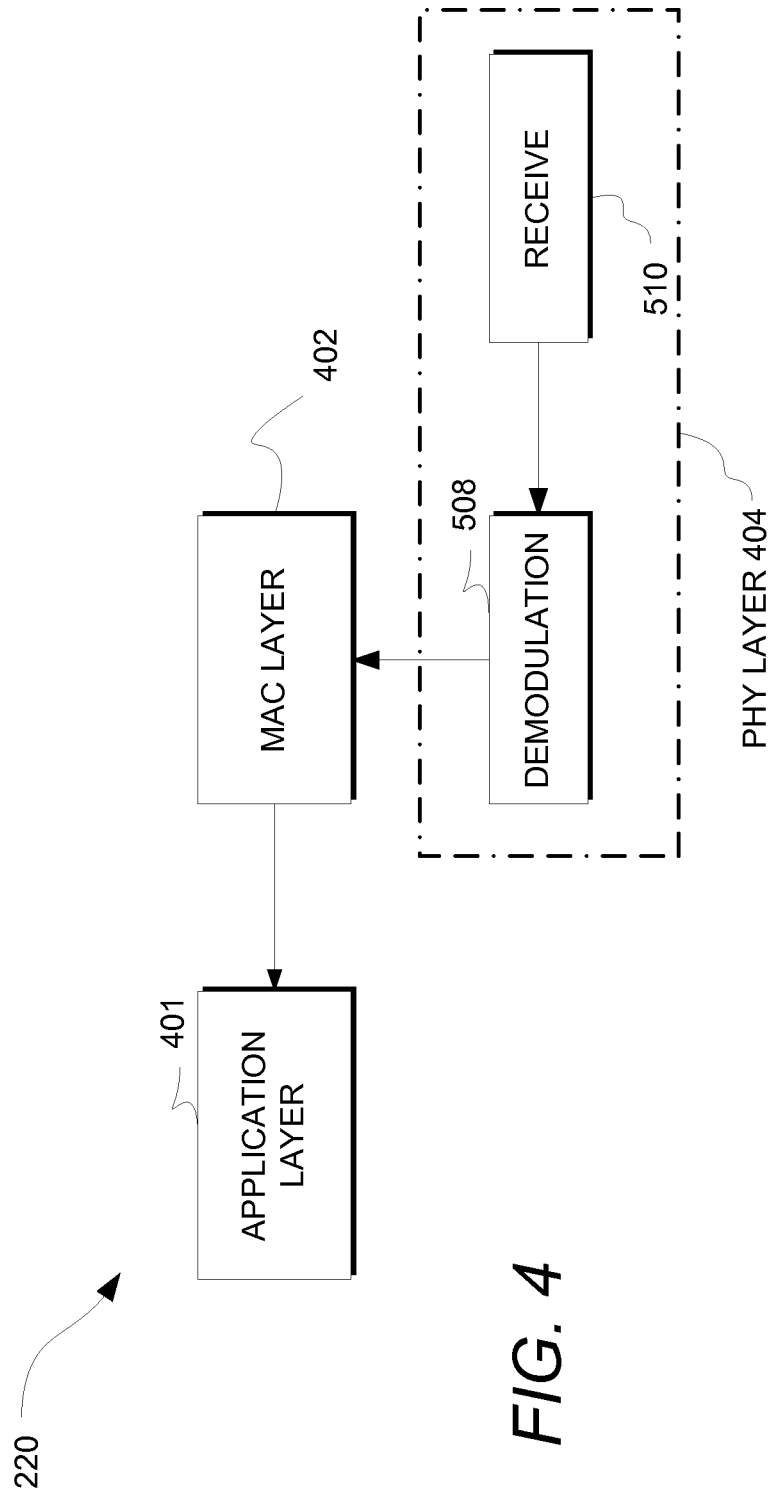
FIG. 4 is a block diagram illustrating a receiver of a device such as illustrated in FIG. 2.

FIG. 4 is a block diagram illustrating an example of the receiver 220 of the device 102. As would be apparent to one of skill in the art, in the illustrated block diagram of FIG. 4, logical modules of the device 102 are illustrated in terms of a layered, abstract description for a communications network. As noted below, each layer may comprise one or more logical modules that may be implemented in software, hardware, or any suitable combination of both. In FIG. 4, the receiver 220 includes the application layer 401 and the MAC layer 402. The PHY layer 404 is in communication with the MAC layer 402. The PHY layer 404 of the receiver includes a demodulation block 508 and a receive block 510. The receive block 510 may include components (not shown) that may comprise an antenna, a power amplifier, and other suitable receiver components. The receive block 510 receives a wireless signal and provides that signal to the demodulation 508, which demodulates the signal and provides received data to the MAC layer 402.

The receiver 220 and the transmitter 222 may employ a variety of wireless physical layer schemes, e.g., on top of the basic time-hopping scheme providing by the pulse generator 406. For example, the physical layer 404 of the receiver 220 and the transmitter 222 may utilize some form of CDMA, TDMA, OFDM, OFDMA, or other modulation and multiplexing schemes.

Data communications in a network may be performed by communicating packets or frames of data. As used herein, a "frame" refers to a formatted block of information that includes at least one of a destination (which may include a multicast or broadcast destination), a quality indicator (e.g., error detection and/or correction data), or a start/end indicator.

In a PAN or BAN, one or more of the devices 102 may be configured to receive data and retransmit that data to another of the devices 102 to provide a multi-hop communications link. Such multi-hop links can be used to increase the effective range of a communication between two or more devices 102 and/or to reduce power consumption on particular devices 102 at the ends of the multi-hop link by allowing such devices 102 to transmit with less power (with decreased range to the intermediate devices 102).

In an ultra-wide band (UWB) system such as the system 100 illustrated in FIG. 1, narrow pulses may be used to transmit and receive information. In such systems, there often is a significant period of time between pulses allowing multiple streams (including concurrent transmitted and received streams) to be interleaved simultaneously. Accordingly, in some aspects, a received multi-hop signal may retransmitted before the complete frame is received, e.g., during a time period that overlaps with the time period in which the frame is received.

Consider the signal received by a particular device 102 configured to relay multi-hop data:

$$x(t) = \sum_{i=0}^{\infty} a_i p_0(t - iT_c) + n(t),$$

where $p_0(t)$ is the received UWB pulse, a channel dispersions, Tc is the peak pulse repetition frequency (PRF), ai is the information sequence and n(t) is the noise process. The relay device 102 transmits the following signal:

$$y(t) = \sum_{i=0}^{\infty} \tilde{a}_i p_1(t - iT_c - T_d),$$

where $p_1(t)$ is the transmitted UWB pulse, $T_d$ is a decoding delay in terms of the number of pulses that are decoded together for retransmission and an additional time delay selected such that there is no or minimal significant performance degradation due to any overlap between the received and transmitted pulses, and $\tilde{a}_i$ is the forwarded information sequence. In general, $T_d$ is proportional to the number of pulses used by the relay device 102 to demodulate a portion of the frame sufficiently to make a decision on the forwarded information sequence, plus any processing delay. When $T_d$ is less than the period of time for the transmitter to transmit the frame, the relay device 102 can decode the pulses before the end of the received frame and the relay device 102 can begin transmitting (e.g., in the same frequency band) before receiving the complete frame. For example, if $T_d$ is about zero (e.g., includes only a small processing delay) chip by chip forwarding such as illustrated below with reference to FIG. 5 can be provided.

Figure 6:
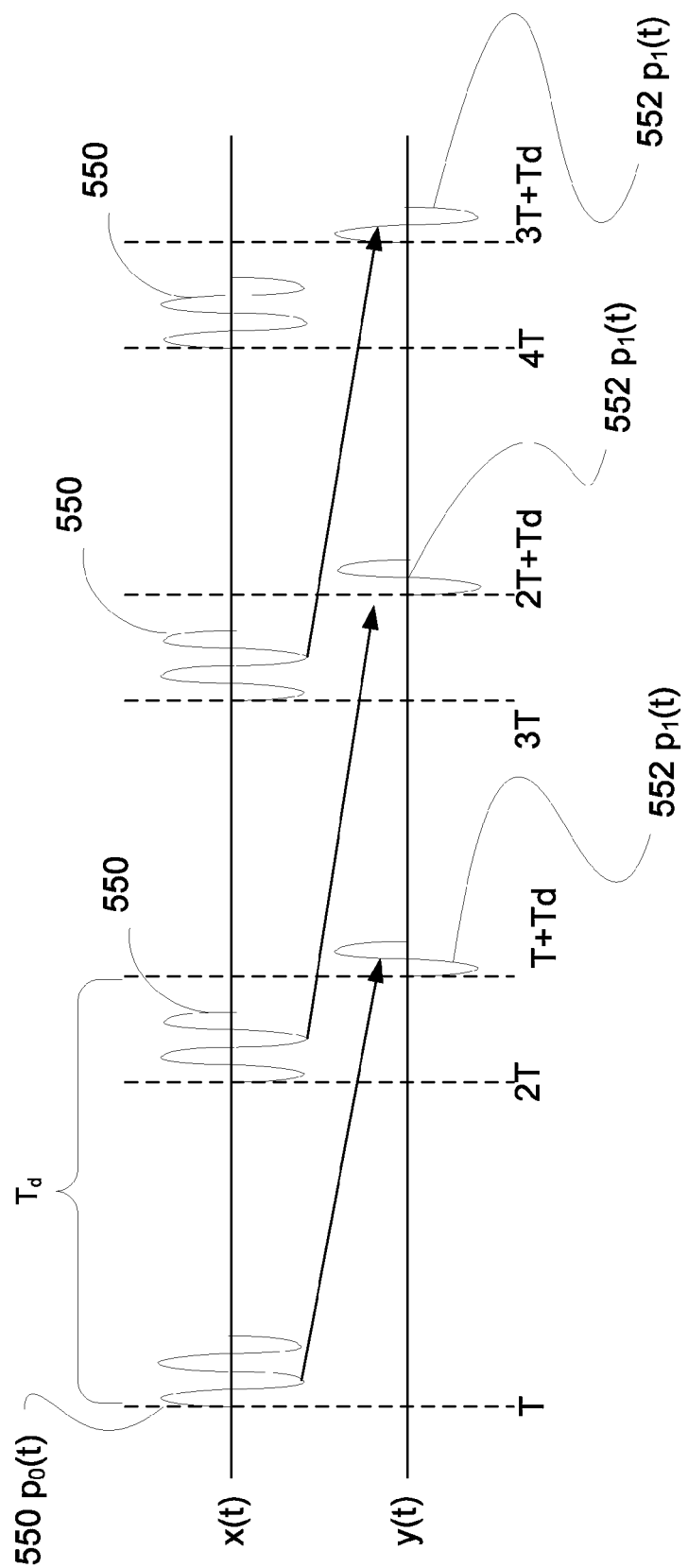
FIG. 6 is a timing diagram illustrating received and transmitted signals in another example of a network such as illustrated in FIG. 1.

The number of chips that are decoded prior to retransmission may be greater than 1, e.g., N, in which case $T_d$ is proportional to N. When N is the number of pulses per bit, bit by bit forwarding can be provided. FIG. 6, discussed below, illustrates an example of bit by bit forwarding in an example of the system 100 in which N=2. Because less than the entire frame is received prior to retransmission of portions of the frame, the total transmission latency or delay generated by each such device 102 in a multi-hop communication system is thereby reduced. Note that in some aspects the value of $T_d$ may be limited by processing delays and other device specific constraints.

Figure 5:
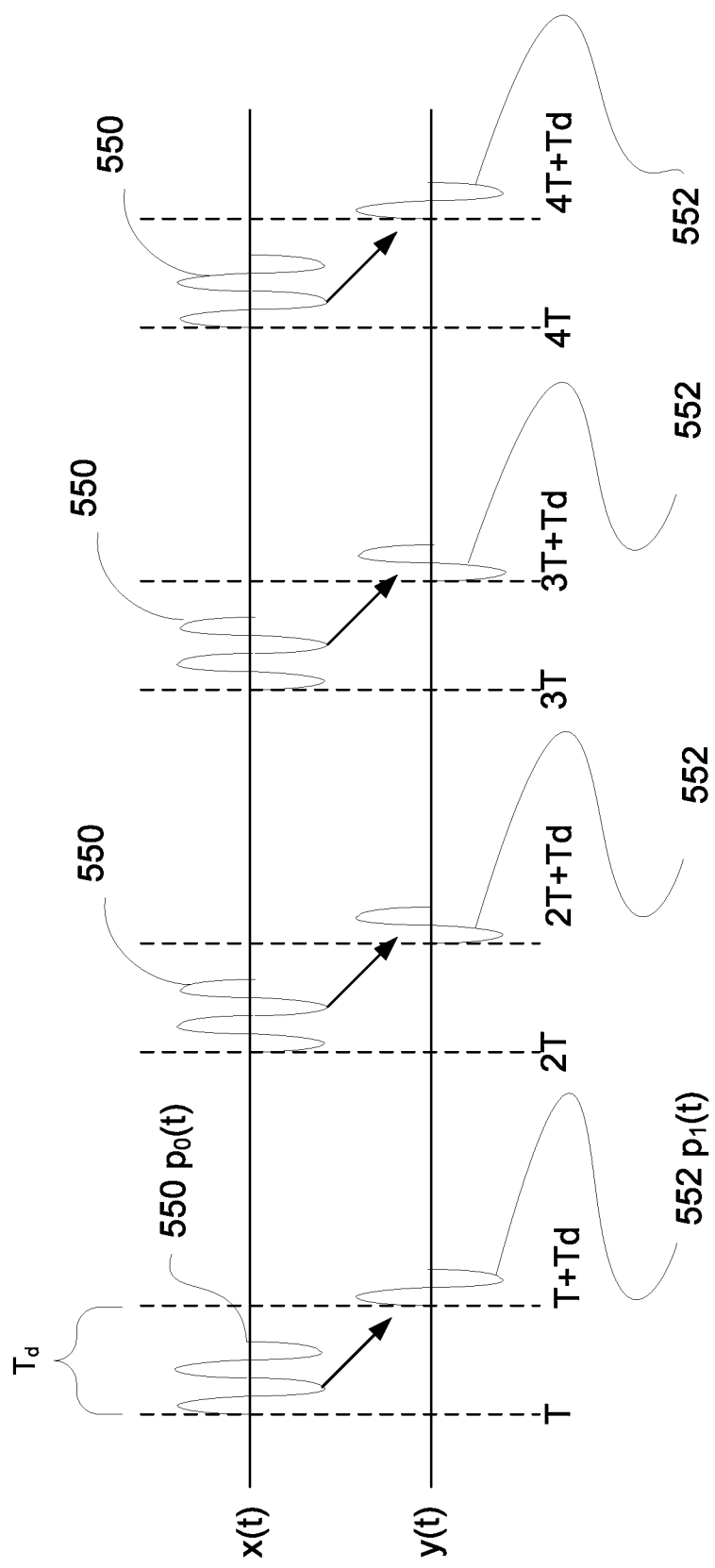
FIG. 5 is a timing diagram illustrating received and transmitted signals in an example of a network such as illustrated in FIG. 1.

FIG. 5 is a timing diagram illustrating received and transmitted signals in an example of the network 100. The horizontal axis denoted by x(t) illustrates the timing of received signals by the receive block 510 of FIG. 4. The horizontal axis denoted by y(t) illustrates the timing of transmitted signals by the transmit block 410 of FIG. 3. As illustrated by the received pulses 550 and the transmitted pulses 552, there is a significant period of time between each received pulse 550 and each pulse 552 allowing multiple streams (including concurrent transmitted and received streams) to be interleaved simultaneously. Each pulse 550 illustrated in FIG. 5 corresponds to a chip (as used herein, a "chip" refers to a binary value generated using a direct spreading code in which each frame is encoded as more chips than bits of formatted frame data).

FIG. 6 is a timing diagram illustrating received and transmitted signals in another example of the network 100. In the example system 100 illustrated in FIG. 6, $T_d$ is proportional to N=2, e.g., the number of chips before pulses are decoded for retransmission is two. If the number of pulses or chips per bit is 2, then the example of FIG. 6 corresponds to bit by bit forwarding. It is to be recognized that in various aspects, the number of chips per bit may be greater than, equal to, or less than N, e.g., the number of chips that are decoded prior to retransmission.

Figure 7:
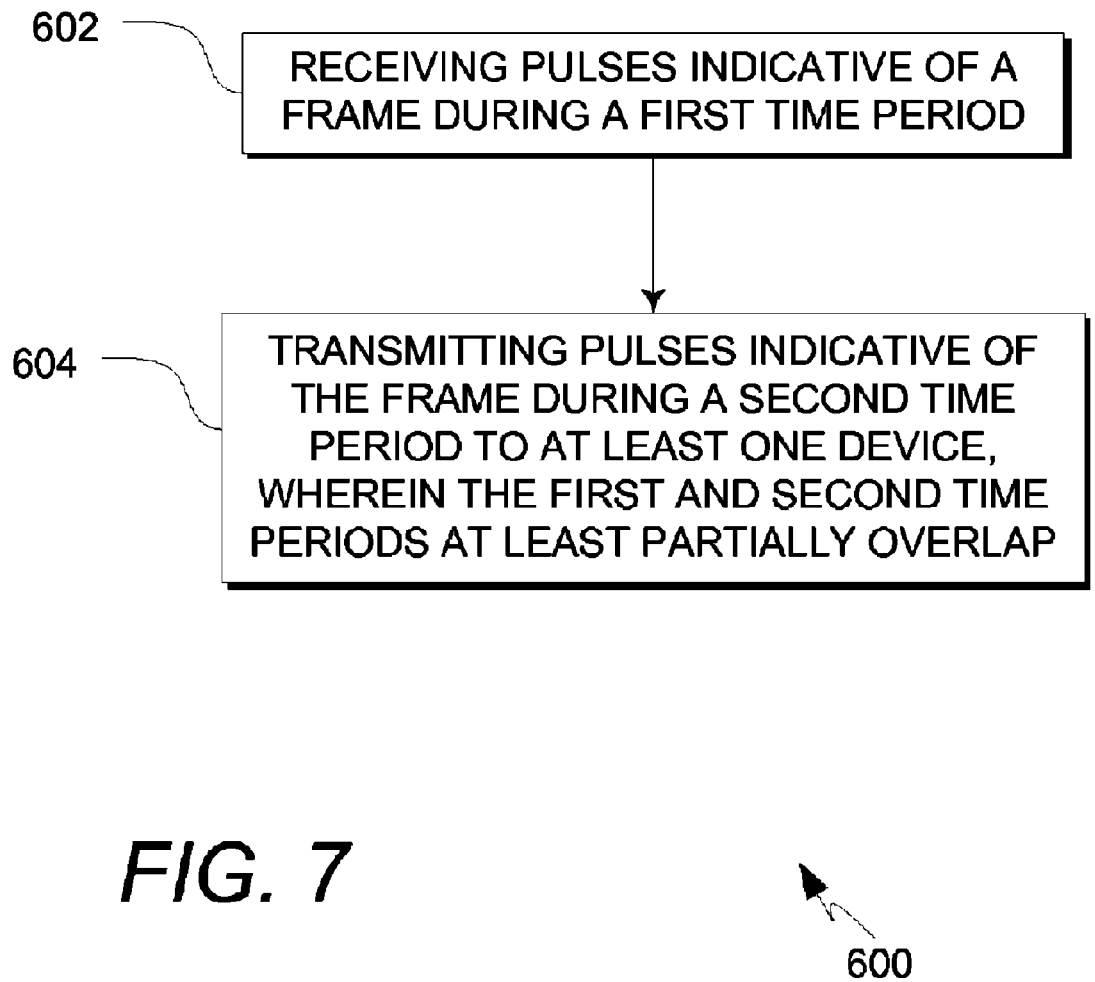
FIG. 7 is a flowchart illustrating an example of a method of communicating data such as in the example network such as illustrated FIG. 1.

FIG. 7 is a flowchart illustrating an example of a method 600 communicating data such as in the network 100. The method 600 begins at a block 602 in which the receiver 220 receives pulses indicative of a frame during a first time period. In some aspects, the receiver 220 demodulates one or more bits or chips of the frame. Next at a block 604, the transmitter 220 transmits pulses indicative of the frame during a second time period to at least one device. The first and second time periods at least partially overlap. In some aspects, the transmitter 220 transmits one or more pulses demodulated as one or more bits or chips of the frame and transmits those bits or chips after receiving a specified number, N, of chips of the frame. The method 600 may be repeated for the data of the frame and for any number of additional frames. For example, acts associated with the blocks 602 and 604 may be repeated and interleaved for substantially similar time periods that overlap except for an initial delay of about $T_c-\Delta T_c-T_d$, as noted above.

In some aspects, the received and/or transmitted pulses comprise discrete pulses. In some aspects, the transmitted and received pulses are in the same frequency band. In some aspects, the transmitted and received pulses are in different frequency bands.

It is to be recognized that depending on the certain aspects, certain acts or events of any of the methods described herein can be performed in a different sequence, may be added, merged, or left out all together (e.g., not all described acts or events are necessary for the practice of the method). Moreover, in certain aspects, acts or events may be performed concurrently, e.g., through multi-threaded processing, interrupt processing, or multiple processors, rather than sequentially.

Figure 8:
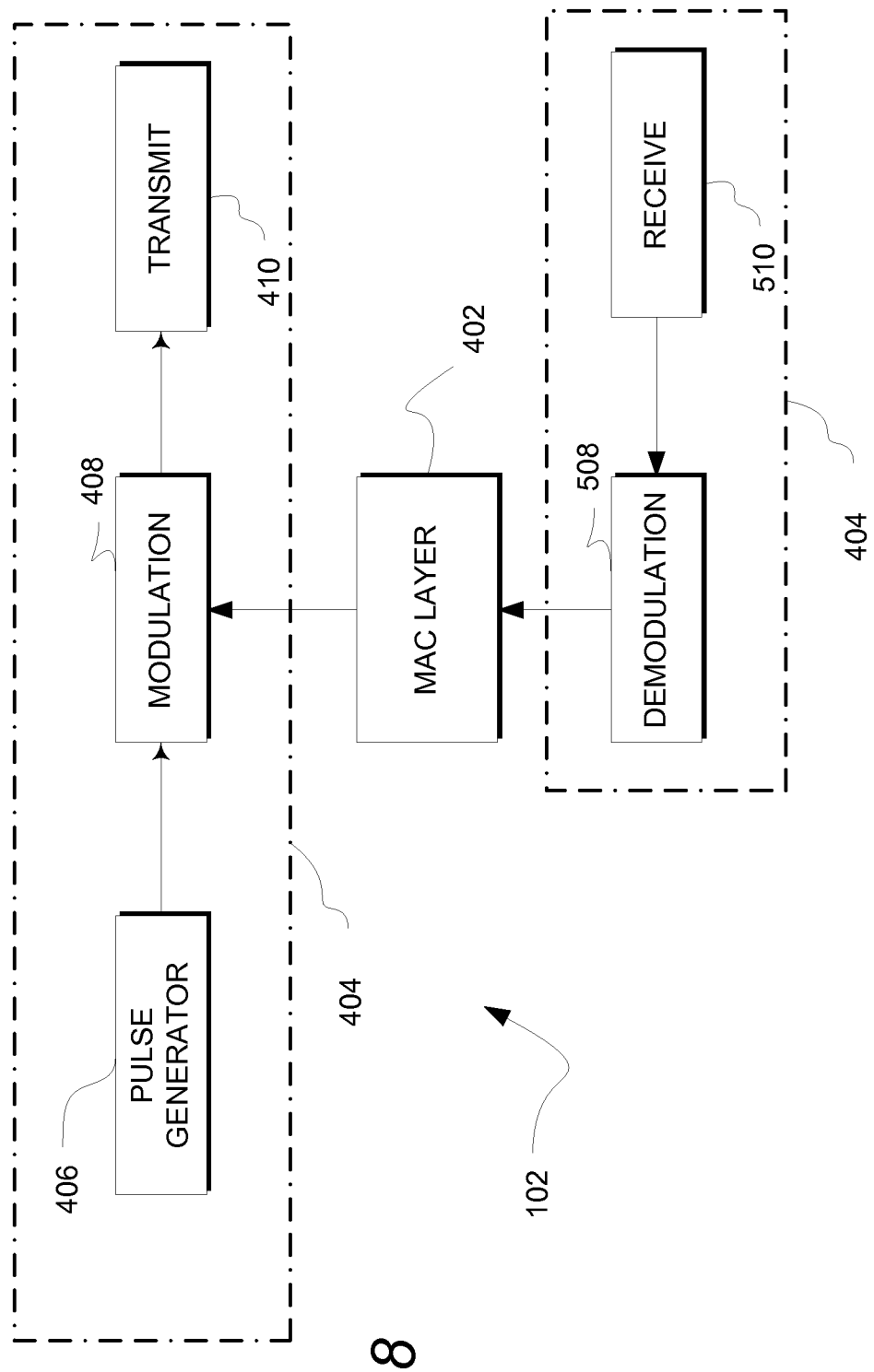
FIG. 8 is a block diagram illustrating a receiver and transmitter, such as illustrated in FIGS. 3 and 4, respectively, configured to receive and transmit data using a method such as illustrated in FIG. 7.

FIG. 8 is a block diagram illustrating the receiver 220 and the transmitter 222, such as illustrated in FIGS. 3 and 4, respectively, configured to receive and transmit data using the method 600. In operation, pulses are received by the receive block 510 and provided to the demodulation block 508. When a specified number of chips or bits is demodulated (e.g., after $\Delta T_c$), the demodulation block 508 provides the demodulated chips (or bits) to the MAC layer 402 which provides the chips or bits to the modulation block 408 of the transmitter 222. After modulation, the transmit block 410 transmits the bits or chips thereby relaying the data of the frame.

In some aspects, the transmitted pulses may be substantially the same as the received pulses. In some aspects, the transmitted pulses may be functionally derived from the received pulses, e.g., frame data identifying the recipient of the frame may be replaced based on a routing algorithm by the MAC layer 402.

Figure 9:
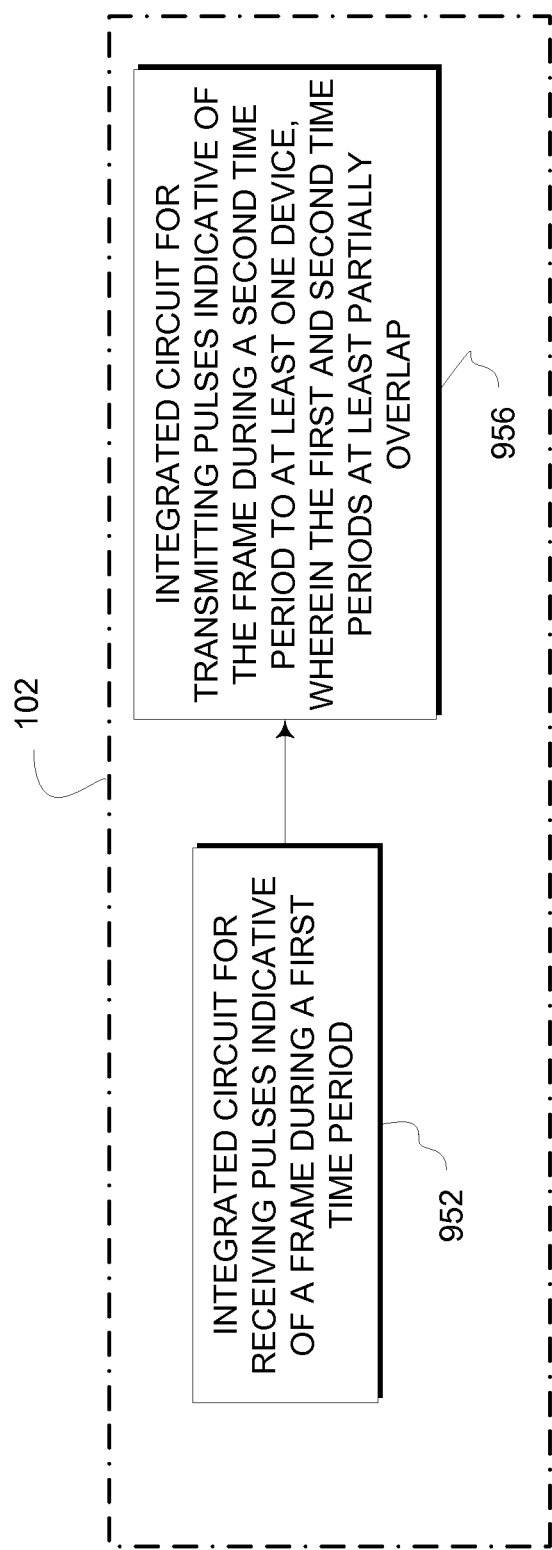
FIG. 9 is a block diagram illustrating an example of the device 102 that transmits data using a method such as illustrated in FIG. 7.

FIG. 9 is a block diagram illustrating an example of the device 102 that generates pulses using the method 600 of FIG. 7. In the illustrated example, the device 102 comprises a means or an integrated circuit (IC) 952 for receiving pulses indicative of a frame during a first time period. The IC 952 may comprise the MAC layer 402 and PHY layer 404 of the receiver 220 of FIGS. 2 and 4. The device 102 also comprises a means or an IC 956 for transmitting pulses indicative of the frame during a second time period to at least one device, wherein the first and second time periods at least partially overlap. The IC 956 may comprise the transmit module 410 of FIG. 3.

In view of the above, one will appreciate that the disclosure addresses how to generate pulses in a pulse based communication system, such as a UWB system. For example, the illustrated aspects provide a lower latency method and apparatus of multi-hop communications. For example, multi-hop latency can be reduced from the time period for transmitting a frame to the time period of transmitting a chip or bit of the frame (plus a small processing offset).

Any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description or both. All changes which come within the meaning and range of equivalency of the claims are to be embraced within their scope.

What is claimed is:

1. A method of communicating data, comprising:
   receiving pulses indicative of a frame during a first time period;
   decoding pulses of the frame during a time interval within the first time period; and
   transmitting pulses based on the decoded pulses during a second time period to at least one device, wherein said first and second time periods at least partially overlap.

2. The method of claim 1, wherein said pulses substantially occupy an ultra-wide band.

3. The method of claim 1, wherein receiving comprises receiving the pulses from a first device, and wherein transmitting further comprises transmitting some of the pulses to a second device and some of the pulses to another device.

4. The method of claim 3, wherein the first device and the second device are the same device.

5. The method of claim 1, wherein the frame comprises at least one data quality indicator for the frame.

6. The method of claim 5, wherein the quality indicator comprises error detection data.

7. The method of claim 1, wherein at least one of the received and transmitted pulses comprises a bit of information.

8. The method of claim 1, wherein at least one of the received and transmitted pulses comprises a chip of information.

9. The method of claim 1, wherein receiving comprises receiving said pulses from a first device and wherein transmitting comprises transmitting at least one of the received pulses to the first device.

10. The method of claim 1, wherein the received pulses are associated with a first frequency band, and further wherein the transmitted pulses are associated with a second frequency band.

11. The method of claim 10, wherein the first frequency band and the second frequency band are the same frequency band.

12. The method of claim 10, wherein the first frequency band is a subset of the second frequency band.

13. The method of claim 1, wherein at least one of the transmitted pulses is functionally derived from at least one of the received pulses.

14. The method of claim 1, wherein each of the received pulses is discrete, and further wherein each of the transmitted pulses is discrete.

15. An apparatus for communicating data, comprising:
a receiver configured to receive pulses indicative of a frame during a first time period;
a decoder adapted to decode pulses of the frame during a time interval within the first time period; and
a transmitter configured to transmit pulses based on the decoded pulses during a second time period to at least one device, wherein said first and second time periods at least partially overlap.

16. The apparatus of claim 15, wherein said pulses substantially occupy an ultra-wide band.

17. The apparatus of claim 15, wherein the receiver is configured to receive the pulses from a first device, and wherein the transmitter is further configured to transmit some of the pulses to a second device and some of the pulses to another device.

18. The apparatus of claim 17, wherein the first device and the second device are the same device.

19. The apparatus of claim 15, wherein the frame comprises at least one data quality indicator for the frame.

20. The apparatus of claim 19, wherein the quality indicator comprises error detection data.

21. The apparatus of claim 15, wherein at least one of the received and transmitted pulses comprises a bit of information.

22. The apparatus of claim 15, wherein at least one of the received and transmitted pulses comprises a chip of information.

23. The apparatus of claim 15, wherein the received pulses are associated with a first frequency band, and further wherein the transmitted pulses are associated with a second frequency band.

24. The apparatus of claim 23, wherein the first frequency band and the second frequency band are the same frequency band.

25. The apparatus of claim 23, wherein the first frequency band is a subset of the second frequency band.

26. The apparatus of claim 15, wherein at least one of the transmitted pulses is functionally derived from at least one of the received pulses.

27. The apparatus of claim 15, wherein each of the received pulses is discrete, and further wherein each of the transmitted pulses is discrete.

28. An apparatus for communicating data, comprising:
means for receiving pulses indicative of a frame during a first time period;
means for decoding pulses of the frame during a time interval within the first time period; and
means for transmitting pulses based on the decoded pulses during a second time period to at least one device, wherein said first and second time periods at least partially overlap.

29. The apparatus of claim 28, wherein said pulses substantially occupy an ultra-wide band.

30. The apparatus of claim 28, wherein the receiving means is configured to receive the pulses from a first device, and wherein the transmitting means is further configured to transmit some of the pulses to a second device and some of the pulses to another device.

31. The apparatus of claim 30, wherein the first device and the second device are the same device.

32. The apparatus of claim 28, wherein the frame comprises at least one data quality indicator for the frame.

33. The apparatus of claim 32, wherein the quality indicator comprises error detection data.

34. The apparatus of claim 28, wherein at least one of the received and transmitted pulses comprises a bit of information.

35. The apparatus of claim 28, wherein at least one of the received and transmitted pulses comprises a chip of information.

36. The apparatus of claim 28, wherein the received pulses are associated with a first frequency band, and further wherein the transmitted pulses are associated with a second frequency band.

37. The apparatus of claim 36, wherein the first frequency band and the second frequency band are the same frequency band.

38. The apparatus of claim 36, wherein the first frequency band is a subset of the second frequency band.

39. The apparatus of claim 28, wherein at least one of the transmitted pulses is functionally derived from at least one of the received pulses.

40. The apparatus of claim 28, wherein each of the received pulses is discrete, and further wherein each of the transmitted pulses is discrete.

41. A computer-program product for communicating data, comprising:
a non-transitory computer-readable medium comprising codes executable by at least one computer to:
receive pulses indicative of a frame during a first time period;
decode pulses of the frame during a time interval within the first time period; and transmit pulses based on the decoded pulses during a second time period to at least one device, wherein said first and second time periods at least partially overlap.

42. A headset for wireless communications, comprising:
a receiver configured to receive pulses indicative of a frame during a first time period;
a decoder adapted to decode pulses of the frame during a time interval within the first time period;
a transmitter configured to transmit pulses based on the decoded pulses during a second time period to at least one device, wherein said first and second time periods at least partially overlap; and
a transducer adapted to process audio information based on at least one of the pulses.

43. A watch for wireless communications, comprising:
a receiver configured to receive pulses indicative of a frame during a first time period via a wireless communication link;
a decoder adapted to decode pulses of the frame during a time interval within the first time period;
a transmitter configured to transmit pulses based on the decoded pulses during a second time period to at least one device via the wireless link, wherein said first and second time periods at least partially overlap; and
a display adapted to provide a visual output based on at least one pulse received via the wireless communication link.

44. A medical device for wireless communications, comprising:
a receiver configured to receive pulses indicative of a frame during a first time period;
a decoder adapted to decode pulses of the frame during a time interval within the first time period;
a transmitter configured to transmit pulses based on the decoded pulses during a second time period to at least one device, wherein said first and second time periods at least partially overlap; and
a sensor adapted to generate sensed data based on at least one of the pulses.

* * * * *